US012603220B2

(12) United States Patent
Yoshino et al.

(10) Patent No.: US 12,603,220 B2
(45) Date of Patent: Apr. 14, 2026

(54) COIL COMPONENT

(71) Applicant: TDK Corporation, Tokyo (JP)

(72) Inventors: Hanako Yoshino, Tokyo (JP); Keigo Higashida, Tokyo (JP); Daisuke Urabe, Tokyo (JP); Takashi Arasawa, Tokyo (JP); Yugo Asai, Tokyo (JP)

(73) Assignee: TDK Corporation, Tokyo (JP)

( * ) Notice: Subject to any disclaimer, the term of this patent is extended or adjusted under 35 U.S.C. 154(b) by 927 days.

(21) Appl. No.: 17/828,335

(22) Filed: May 31, 2022

(65) Prior Publication Data

US 2022/0384093 A1 Dec. 1, 2022

(30) Foreign Application Priority Data

Jun. 1, 2021 (JP) ................................ 2021-092246

(51) Int. Cl.

| | |
|---|---|
| ***H01F 27/28*** | (2006.01) |
| ***H01F 27/29*** | (2006.01) |
| ***H01F 27/30*** | (2006.01) |

(52) U.S. Cl.

CPC ........... *H01F 27/306* (2013.01); *H01F 27/29* (2013.01)

(58) Field of Classification Search

CPC ...... H01F 27/306; H01F 27/29; H01F 17/045; H01F 27/2828; H01F 27/292; H01F 5/04; H01F 5/00; H01F 27/34

USPC ........................................ 336/192, 221, 198

See application file for complete search history.

(56) References Cited

U.S. PATENT DOCUMENTS

| | | | | |
|---|---|---|---|---|
| 2007/0285200 | A1* | 12/2007 | Hsieh | H01F 27/027 336/83 |
| 2016/0240306 | A1 | 8/2016 | Kanbe | |
| 2017/0316873 | A1* | 11/2017 | Igarashi | H01F 27/2828 |
| 2017/0316874 | A1* | 11/2017 | Igarashi | H01F 27/292 |
| 2018/0005751 | A1 | 1/2018 | Igarashi et al. | |
| 2018/0374631 | A1* | 12/2018 | Igarashi | H01F 17/04 |
| 2019/0080834 | A1* | 3/2019 | Someya | H01F 27/292 |
| 2019/0148055 | A1* | 5/2019 | Moriya | H01F 27/24 336/83 |
| 2020/0098511 | A1* | 3/2020 | Mikogami | H01F 27/292 |
| 2020/0111602 | A1 | 4/2020 | Mikogami et al. | |

FOREIGN PATENT DOCUMENTS

| | | | | |
|---|---|---|---|---|
| JP | H5 - 87911 | U | 11/1993 | |
| JP | 2000195753 | A | 7/2000 | |
| JP | 2005251970 | A | 9/2005 | |
| JP | 2016149490 | A | 8/2016 | |
| JP | 6065122 | B2 | 1/2017 | |
| JP | 2017-199841 | A | 11/2017 | |
| JP | 2018-006438 | A | 1/2018 | |
| WO | WO-2015045955 | A1 * | 4/2015 | H01R 43/02 |

* cited by examiner

*Primary Examiner* — Shawki S Ismail
*Assistant Examiner* — Kazi S Hossain
(74) *Attorney, Agent, or Firm* — Rimon P.C.

(57) ABSTRACT

Disclosed herein is a coil component that includes a drum core; a terminal fitting fixed respectively to the flange part of the drum core; and a wire wound around the winding core part of the drum core. The terminal fitting has a wire connecting part to which the wire is connected and a mounting part having springiness with respect to the drum core. The distance between the flange part and the mounting part is larger than the distance between the flange part and the wire connecting part.

7 Claims, 12 Drawing Sheets

COIL COMPONENT

CROSS REFERENCE TO RELATED APPLICATION

This application claims the benefit of Japanese Application No. 2021-092246, filed on Jun. 1, 2021, the entire contents is hereby incorporated by reference.

BACKGROUND OF THE INVENTION

Field of the Invention

The present invention relates to a coil component and, more particularly, to a coil component having a structure in which a terminal fitting is fixed to a flange part of a drum core.

Description of Related Art

JP 2018-006438A discloses a coil component having a structure in which a terminal fitting is fixed to a flange part of a drum core. The terminal fitting employed in the invention disclosed in JP 2018-006438A has an L-shape, and a wire is connected to a part of the terminal fitting that covers a mounting surface of the flange part. However, in JP 2018-006438A, when the coil component is mounted on a substrate, the end portion of the wire disadvantageously interferes with the substrate.

JP 2017-199841A discloses a coil component in which a step is formed in the flange part to prevent interference between the wire end portion and the substrate. However, a large step needs to be formed to reliably prevent interference between the wire end portion and the substrate, which could give rise to a problem of not only complicating the shape of the drum core but also reducing the volume of the drum core.

In a coil component described in Japanese Patent No. 6,065,122, the mounting part of the terminal fitting is separated upward from the flange part of the drum core to prevent interference between the wire end portion and the substrate.

However, in the coil component described in Japanese Patent No. 6,065,122, a wire connecting part of the terminal fitting protrudes outward in the width direction of the drum core, so that a mounting area is disadvantageously increased. In addition, the wire connecting part is more likely to be subjected to an external force to increase a risk of breakage thereof.

SUMMARY

It is therefore an object of the present invention to provide a coil component capable of preventing interference between the wire end portion and the substrate without complicating the shape of the drum core and without providing a protruding part in the terminal fitting.

A coil component according to the present invention includes: a drum core having a winding core part with its axis directed to a first direction, a first flange part positioned at one end of the winding core part in the first direction, and a second flange part positioned at the other end of the winding core part in the first direction; first and second terminal fittings fixed respectively to the first and second flange parts; and a wire wound around the winding core part and having one end connected to the first terminal fitting and the other end connected to the second terminal fitting. The first and second flange parts each have a first surface extending in the first direction and a second direction perpendicular to the first direction. The first and second terminal fittings each have a wire connecting part to which the wire is connected and a mounting part having springiness with respect to the drum core. The wire connecting part and mounting part both overlap the first surface in a third direction perpendicular to the first and second directions. The wire connecting part has a second surface extending in the first and second directions and facing the same direction as the first surface. The mounting part has a third surface extending in the first and second directions and facing the same direction as the first surface. The distance between the first and third surfaces is larger than the distance between the first and second surfaces.

According to the present invention, it is possible to prevent interference between the end portion of the wire and the substrate without complicating the shape of the drum core and without providing a protruding part in the terminal fitting. In addition, the mounting part has springiness, so that even when stress is applied to the solder due to a difference in thermal expansion coefficient between the drum core and the substrate, the stress is relaxed by the mounting part having springiness, which makes it less likely to cause cracks in the solder.

In the present invention, a part of the first surface that overlaps the wire connecting part in the third direction and another part of the first surface that overlaps the mounting part in the third direction may constitute the same plane. With this configuration, the shape of the drum core can be more simplified, and a sufficient volume can be secured for the drum core.

In the present invention, the mounting part and the first surface may not contact each other to form a gap therebetween in the third direction. This provides high springiness.

In the present invention, the mounting part may include first and second mounting parts, and the wire connecting part may be positioned between the first and second mounting parts. This further enhances mounting strength.

In the present invention, the mounting part may have a folded part positioned between the first and third surfaces, or may have a bent part bent such that the mounting part becomes locally close to the first surface. With this configuration, even when an external force is applied in the third direction to the coil component in a state of being mounted on the substrate, the drum core is less apt to be damaged.

In the present invention, the wire may be connected to the second surface of the wire connecting part or a part of the wire connecting part that is different from the second surface. The former facilitates wire connection, and the latter makes the wire end portion and the substrate much less likely to interfere with each other.

As described above, according to the present invention, there can be provided a coil component capable of preventing interference between the wire end portion and the substrate without complicating the shape of the drum core and without providing a protruding part in the terminal fitting.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 3A is a schematic perspective view, FIG. 3B is a yz front view, and FIG. 3C is an xz side view.

FIG. 6A is a schematic perspective view, FIG. 6B is a yz front view, and FIG. 6C is an xz side view;

DETAILED DESCRIPTION OF THE EMBODIMENTS

Preferred embodiments of the present invention will now be explained in detail with reference to the drawings.

First Embodiment

Figure 1:
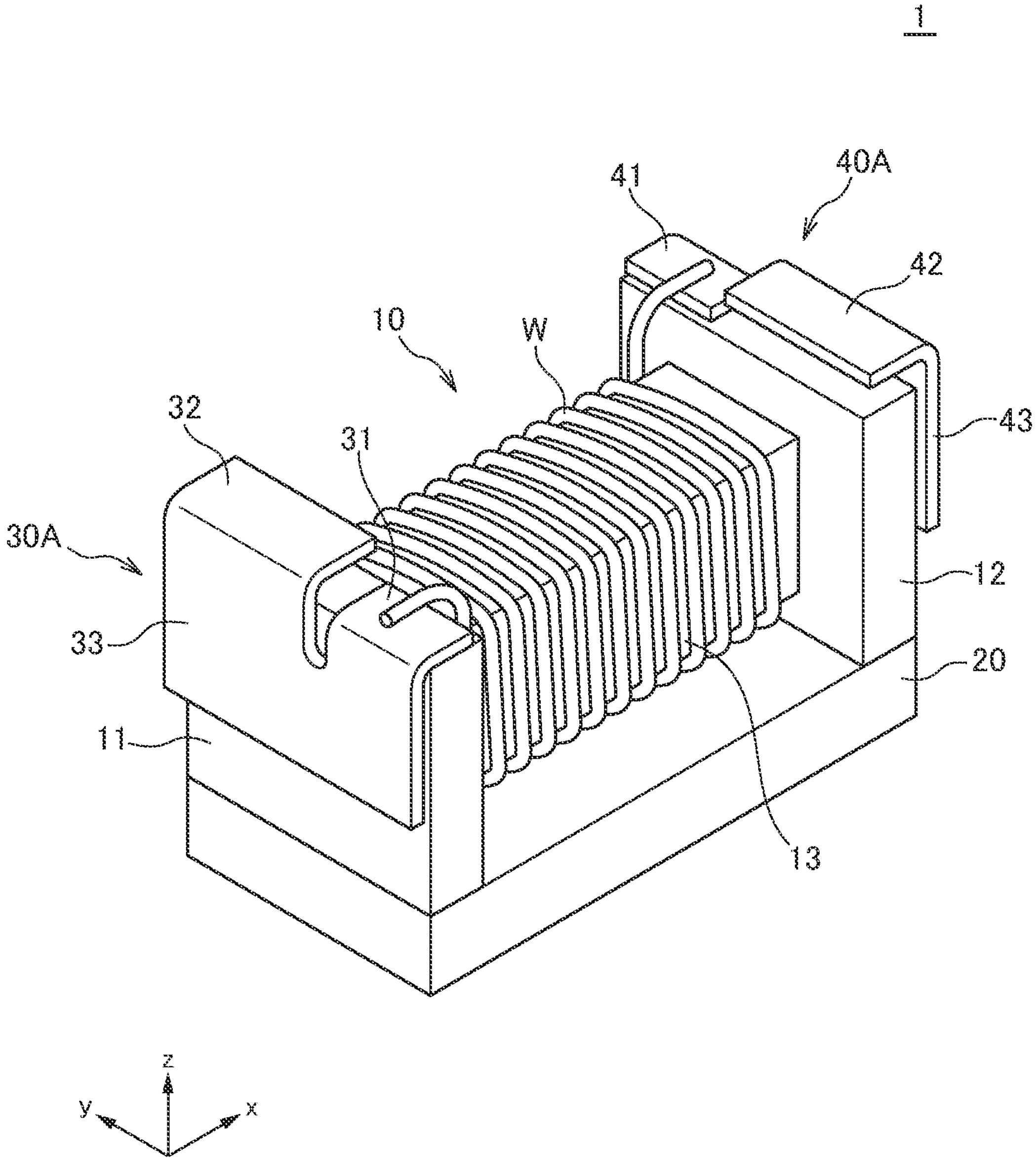
FIG. 1 is a schematic perspective view illustrating the outer appearance of a coil component 1 according to a first embodiment of the present invention.
Figure 2:
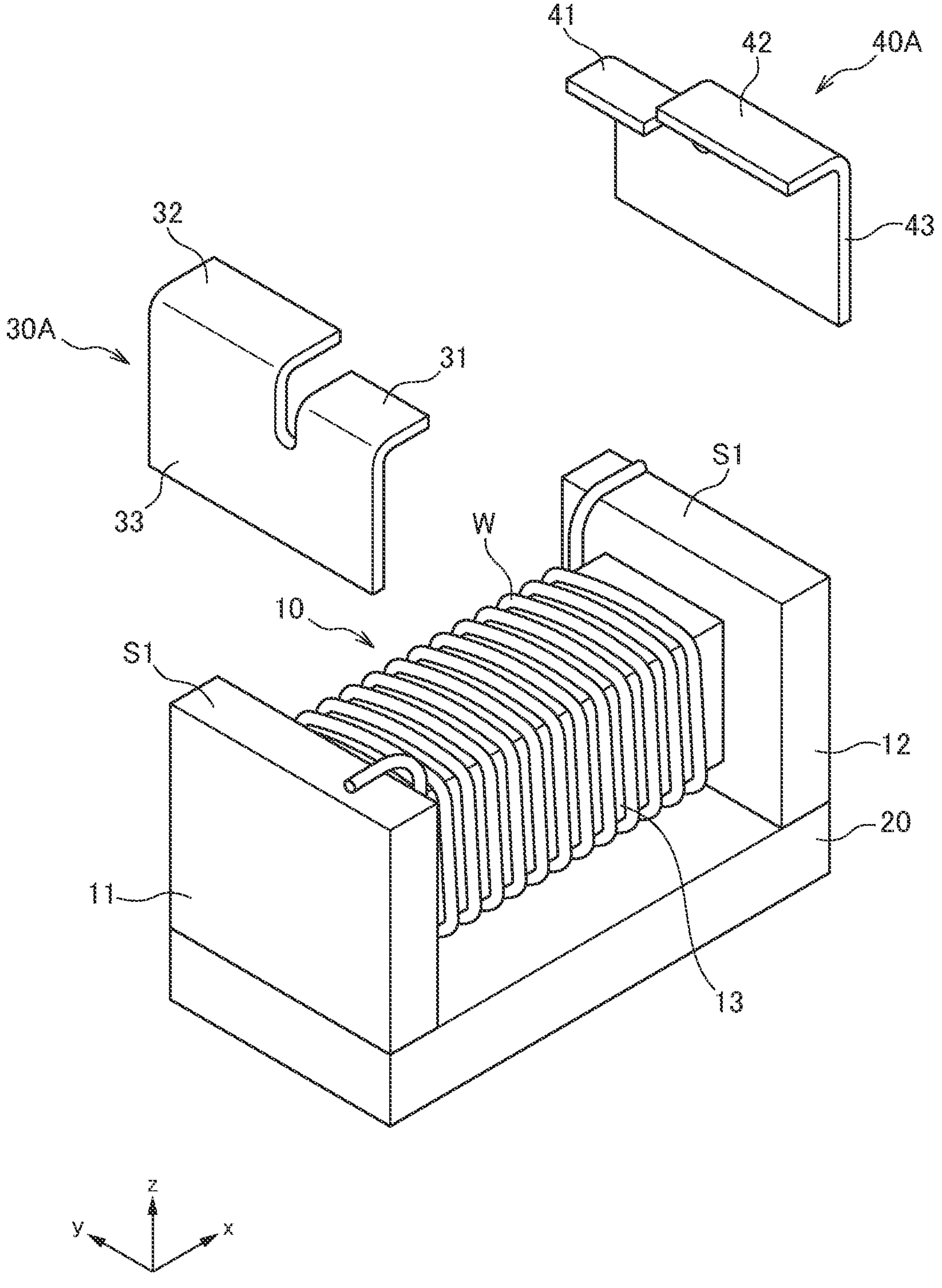
FIG. 2 is a schematic exploded perspective view of the coil component 1.

FIG. 1 is a schematic perspective view illustrating the outer appearance of a coil component 1 according to a first embodiment of the present invention. FIG. 2 is a schematic exploded perspective view of the coil component 1.

As illustrated in FIGS. 1 and 2, the coil component 1 according to the first embodiment includes a drum core 10, a plate core 20, a terminal fitting 30A fixed to a first flange part 11 of the drum core 10, a terminal fitting 40A fixed to a second flange part 12 of the drum core 10, and a wire W wound around a winding core part 13 of the drum core 10. One end portion of the wire W is connected to the terminal fitting 30A and the other end thereof is connected to the terminal fitting 40A. The winding core part 13 of the drum core 10 has its axis extending in the x-direction. The flange part 11 is provided at one end portion in the axial direction, and the flange part 12 is provided at the other end portion in the axial direction. The drum core 10 is made of a magnetic material having a high permeability, such as Ni—Zn based ferrite. Like the drum core 10, the plate core 20 is made of a magnetic material having a high permeability, such as Ni—Zn based ferrite and is fixed to the flange parts 11 and 12 by an adhesive or the like to form a closed loop magnetic path. The plate core 20 may not necessarily be used in the present invention, but using the plate core 20 can significantly increase inductance.

Figure 3A:
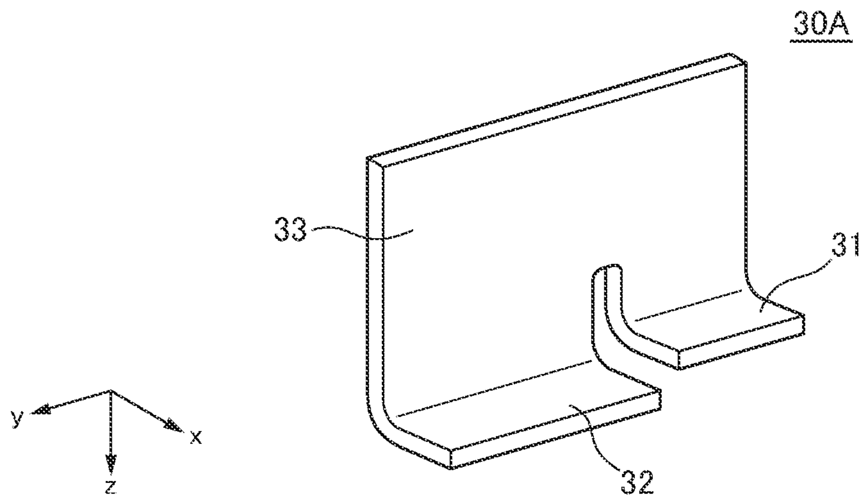
FIGS. 3A to 3C are views for explaining the shape of the terminal fitting 30A, where
Figure 3B:
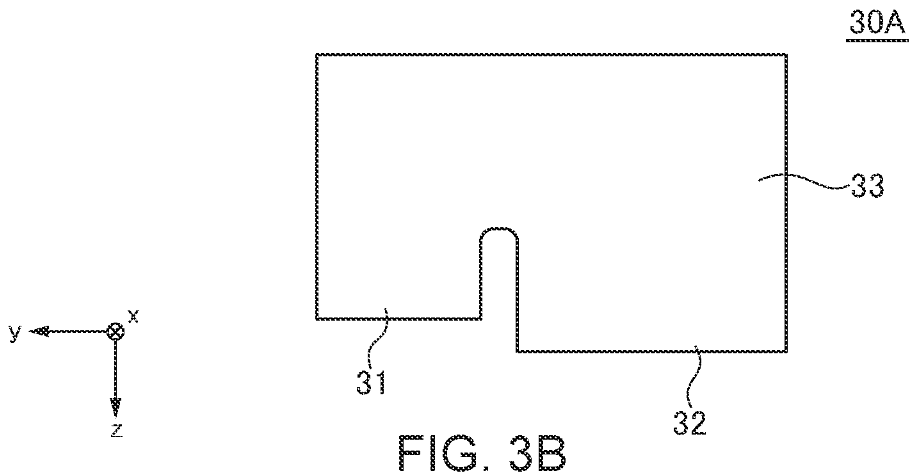
Figure 3C:
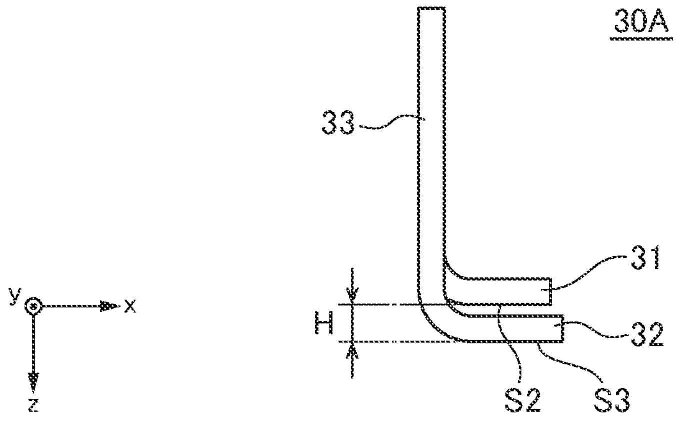

FIGS. 3A to 3C are views for explaining the shape of the terminal fitting 30A. FIG. 3A is a schematic perspective view, FIG. 3B is a yz front view, and FIG. 3C is an xz side view. Although not illustrated, the terminal fitting 40A has the same shape.

The terminal fitting 30A is a metal member made of a good conductor such as copper and has a wire connecting part 31, a mounting part 32, and a connection part 33 connecting the wire connecting part 31 and the mounting part 32, as illustrated in FIGS. 3A to 3C. Similarly, the terminal fitting 40A has a wire connecting part 41, a mounting part 42, and a connection part 43. The wire connecting part 31 is a part to which the end portion of the wire W is connected, and the mounting part 32 is a part connected to a land pattern of a substrate in a state where the coil component 1 is mounted on the substrate. The connection part 33 has a plate-like shape having a yz main surface and, as illustrated in FIG. 1, covers the outer surface of the flange part 11 constituting the yz plane. The wire connecting part 31 and the mounting part 32 are each formed by bending the end portion of the connection part 33 in the x-direction and have surfaces S2 and S3, respectively, each constituting the xy plane. The surfaces S2 and S3 are separated from each other in the z-direction by a height H. The surface S2 is a surface to which the end portion of the wire W is connected, and the surface S3 is a surface facing the land pattern of the substrate. Both the surfaces S2 and S3 face the same direction as a surface S1 of the flange part 11.

The terminal fitting 30A can be fixed to the flange part 11 by an adhesive applied onto the surface S1 of the flange part 11 constituting the xy plane. In a state where the terminal fitting 30A is connected to the flange part 11, the wire connecting part 31 and mounting part 32 overlap the flange part 11 in the z-direction, and the connection part 33 overlaps the flange part 11 in the x-direction. The width of the terminal fitting 30A in the y-direction is smaller than the width of the flange part in the y-direction, so that the terminal fitting 30A does not have a part protruding from the flange part 11 in the y-direction. The wire connecting part 31 is directly fixed to the surface S1 of the flange part 11 through an adhesive or the like, while the mounting part 32 does not contact the surface S1 of the flange part 11, so that a z-direction gap is formed between the mounting part 32 and the surface S1 of the flange part 11. Thus, the mounting part 32 has springiness with respect to the drum core 10.

Figure 4:
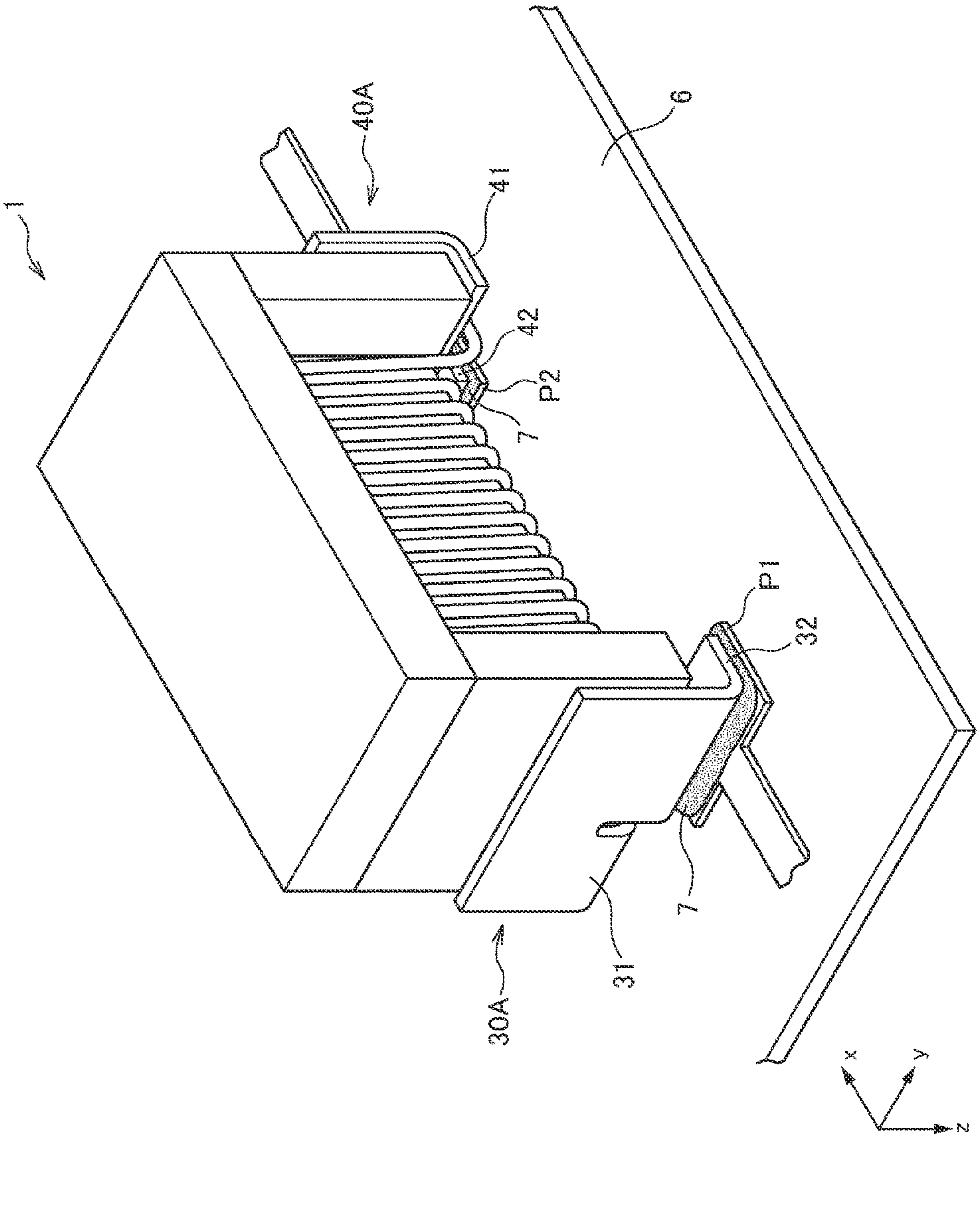
FIG. 4 is a schematic perspective view illustrating a state where the coil component 1 is mounted on a substrate 6.

FIG. 4 is a schematic perspective view illustrating a state where the coil component 1 according to the present embodiment is mounted on a substrate 6.

As illustrated in FIG. 4, the coil component 1 according to the present embodiment is mounted on the substrate 6 such that a land pattern P1 formed on the surface of the substrate 6 and the surface S3 of the mounting part 32 of the terminal fitting 30A face each other and that a land pattern P2 formed on the surface of the substrate 6 and the surface S3 of the mounting part 42 of the terminal fitting 40A face each other. The land patterns P1 and P2 are mechanically and electrically connected to the mounting parts 32 and 42, respectively, through a separate solder 7. The distance between the surface S1 of the flange part 11 (12) and the surface S3 of the mounting part 32 (42) in the z-direction and the distance between the surface S1 of the flange part 11 (12) and the surface S2 of the wire connecting part 31 (41) in the z-direction differ from each other by a height H, so that in a state where the coil component 1 is mounted on the substrate 6, a gap corresponding to the height H is formed between the substrate 6 and the surface S2 of the wire connecting part 31 (41). This prevents the end portion of the wire W connected to the surface S2 of the wire connecting part 31 (41) from interfering with the substrate 6.

In addition, the mounting part 32 (42) is not directly fixed to the surface S1 of the flange part 11 (12) and thereby has springiness, so that even if a temperature change should occur after the coil component 1 is mounted on the substrate 6, stress applied to the solder 7 is relaxed by the springiness of the mounting part 32 (42). This increases the mounting reliability of the coil component 1. Further, the surface S1 of the flange part 11 (12) is flat without a step, and a part of the surface S1 that overlaps the wire connecting part 31 (41) in the z-direction and a part thereof that overlaps the mounting part 32 (42) in the z-direction constitute the same plane, so that the shape of the drum core 10 becomes simpler, and a sufficient volume is secured for the drum core 10. Furthermore, it is not necessary to provide a land pattern at a part of the substrate 6 that overlaps the wire connecting part 31 (41), thus reducing a stray capacitance component generated by the land pattern.

Second Embodiment

Figure 5:
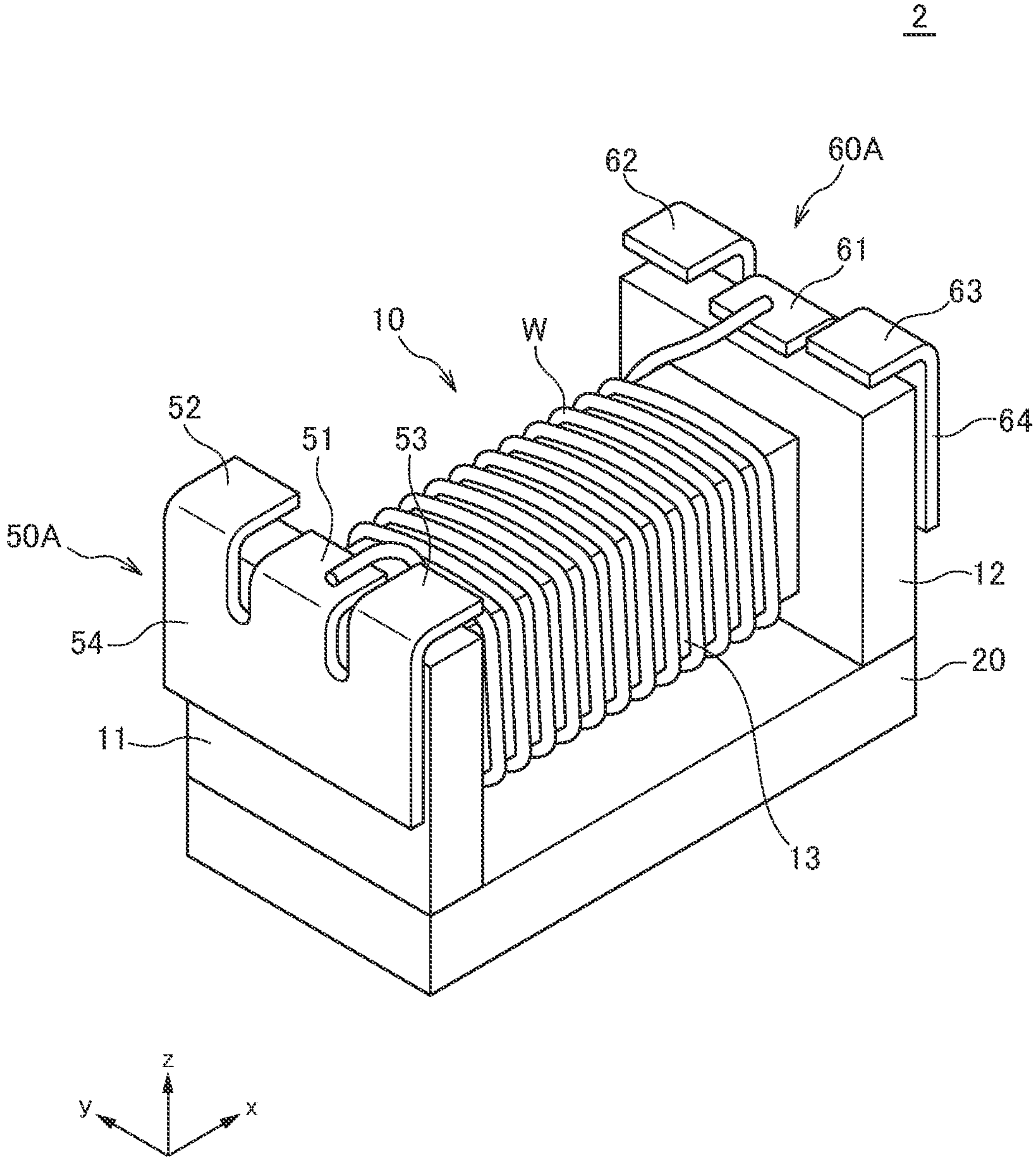
FIG. 5 is a schematic perspective view illustrating the outer appearance of a coil component 2 according to a second embodiment of the present invention.

FIG. 5 is a schematic perspective view illustrating the outer appearance of a coil component 2 according to a second embodiment of the present invention.

As illustrated in FIG. 5, the coil component 2 according to the second embodiment differs from the coil component 1 according to the first embodiment in that terminal fittings 50A and 60A are used in place of the terminal fittings 30A and 40A. Other basic configurations are the same as those of the coil component 1 according to the first embodiment, so the same reference numerals are given to the same elements, and overlapping description will be omitted.

Figure 6A:
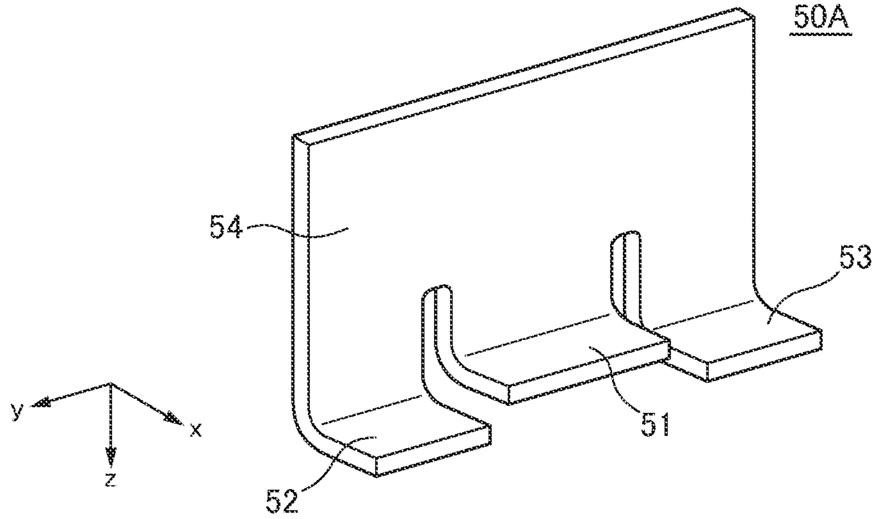
FIGS. 6A to 6C are views for explaining the shape of the terminal fitting 50A, where
Figure 6B:
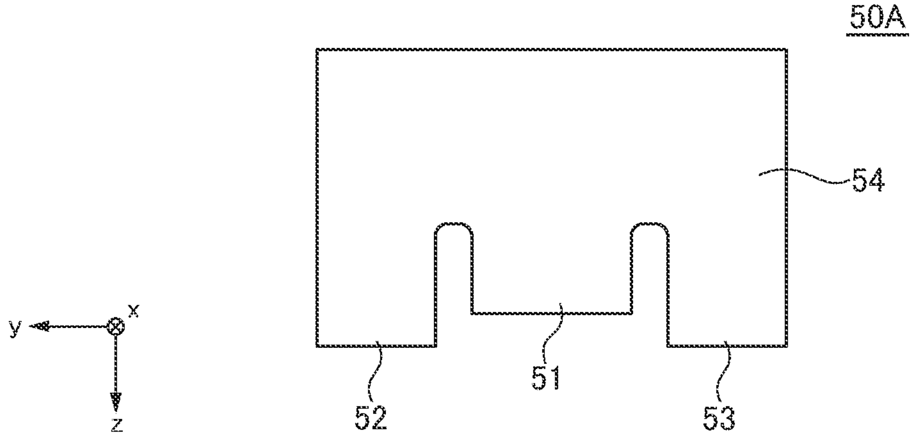
Figure 6C:
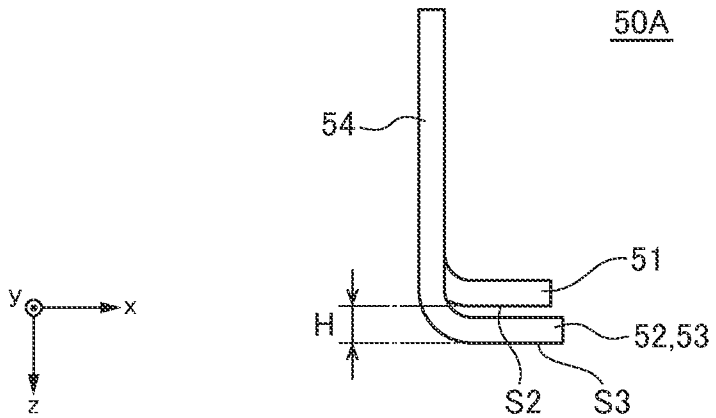

FIGS. 6A to 6C are views for explaining the shape of the terminal fitting 50A. FIG. 6A is a schematic perspective view, FIG. 6B is a yz front view, and FIG. 6C is an xz side view. Although not illustrated, the terminal fitting 60A has the same shape.

As illustrated in FIGS. 6A to 6C, the terminal fitting 50A has a wire connecting part 51, mounting parts 52, 53, and a connection part 54 connecting the wire connecting part 51 and the mounting parts 52, 53. The wire connecting part 51 is positioned between the mounting parts 52 and 53. Similarly, the terminal fitting 60A has a wire connecting part 61, mounting parts 62, 63, and a connection part 64 connecting the wire connecting part 61 and the mounting parts 62, 63. The wire connecting part 51 is a part to which the end portion of the wire W is connected, and the mounting parts 52 and 53 are each a part to be connected to a land pattern of a substrate in a state where the coil component 2 is mounted on the substrate. The connection part 54 has a plate-like shape having a yz main surface and, as illustrated in FIG. 5, covers the outer surface of the flange part 11 constituting the yz plane. The wire connecting part 51 and mounting parts 52, 53 are each formed by bending the end portion of the connection part 54 in the x-direction and have surfaces S2 and S3, respectively, each constituting the xy plane. The surfaces S2 and S3 are separated from each other in the z-direction by a height H. The surface S2 is a surface to which the end portion of the wire W is connected, and the surface S3 is a surface facing the land pattern of the substrate.

The terminal fitting 50A can be fixed to the flange part 11 by an adhesive applied onto the surface S1 of the flange part 11 constituting the xy plane. In a state where the terminal fitting 50A is connected to the flange part 11, the wire connecting part 51 and the mounting parts 52, 53 overlap the flange part 11 in the z-direction, and the connection part 54 overlaps the flange part 11 in the x-direction. The width of the terminal fitting 50A in the y-direction is smaller than the width of the flange part in the y-direction, so that the terminal fitting 50A does not have a part protruding from the flange part 11 in the y-direction. The wire connecting part 51 is directly fixed to the surface S1 of the flange part 11 through an adhesive or the like, while the mounting parts 52, 53 do not contact the surface S1 of the flange part 11, so that a z-direction gap is formed between the mounting parts 52, 53 and the surface S1 of the flange part 11. Thus, the mounting parts 52, 53 have springiness with respect to the drum core 10.

Figure 7:
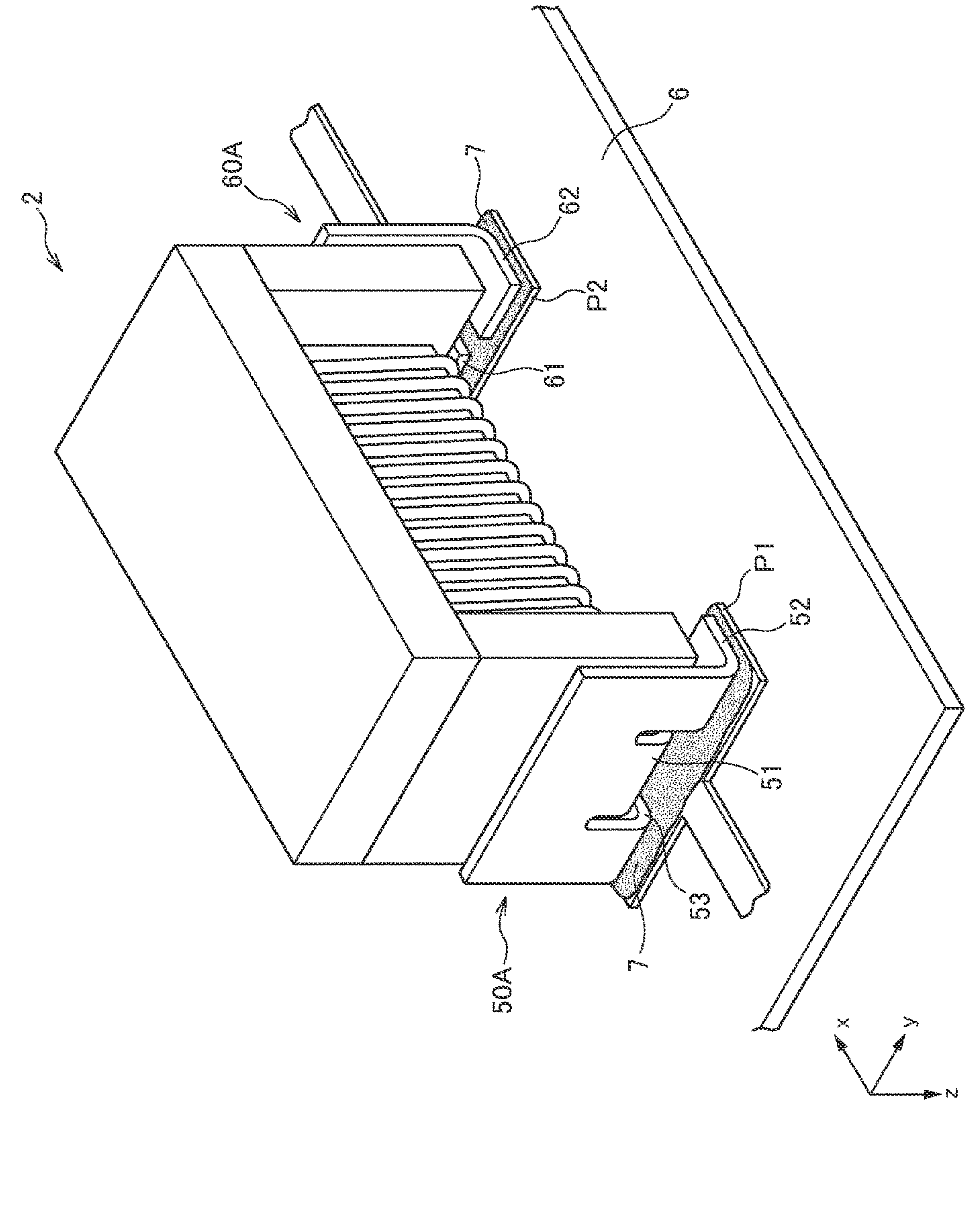
FIG. 7 is a schematic perspective view illustrating a state where the coil component 2 is mounted on the substrate 6.

FIG. 7 is a schematic perspective view illustrating a state where the coil component 2 according to the present embodiment is mounted on the substrate 6.

As illustrated in FIG. 7, the coil component 2 according to the present embodiment is mounted on the substrate 6 such that the land pattern P1 formed on the surface of the substrate 6 and the surface S3 of each of the mounting parts 52 and 53 of the terminal fitting 50A face each other and that the land pattern P2 formed on the surface of the substrate 6 and the surface S3 of each of the mounting parts 62 and 63 of the terminal fitting 60A face each other. The land patterns P1 an P2 are mechanically and electrically connected to the mounting parts 52, 53 and 62, 63, respectively, through the separate solder 7. The land pattern P1 may be separated into a part facing the mounting part 52 and a part facing the mounting part 53. Similarly, the land pattern P2 may be separated into a part facing the mounting part 62 and a part facing the mounting part 63. As in the first embodiment, the distance between the surface S1 of the flange part 11 (12) and the surface S3 of each of the mounting parts 52 and 53 (62 and 63) in the z-direction and the distance between the surface S1 of the flange part 11 (12) and the surface S2 of the wire connecting part 51 (61) in the z-direction differ from each other by a height H, so that in a state where the coil component 2 is mounted on the substrate 6, a gap corresponding to the height H is formed between the substrate 6 and the surface S2 of the wire connecting part 51 (61). This prevents the end portion of the wire W connected to the surface S2 of the wire connecting part 51 (61) from interfering with the substrate 6.

In addition, the mounting parts 52 and 53 (62 and 63) are not directly fixed to the surface S1 of the flange part 11 (12) and thereby have springiness, so that even if a temperature change should occur after the coil component 2 is mounted on the substrate 6, stress applied to the solder 7 is relaxed by the springiness of the mounting parts 52 and 53 (62 and 63). This increases the mounting reliability of the coil component 2. Further, the two mounting parts 52 and 53 are connected to the land pattern P1, and the two mounting parts 62 and 63 are connected to the land pattern P2, thus making it possible to achieve higher mounting strength than in the first embodiment.

Third Embodiment

Figure 8:
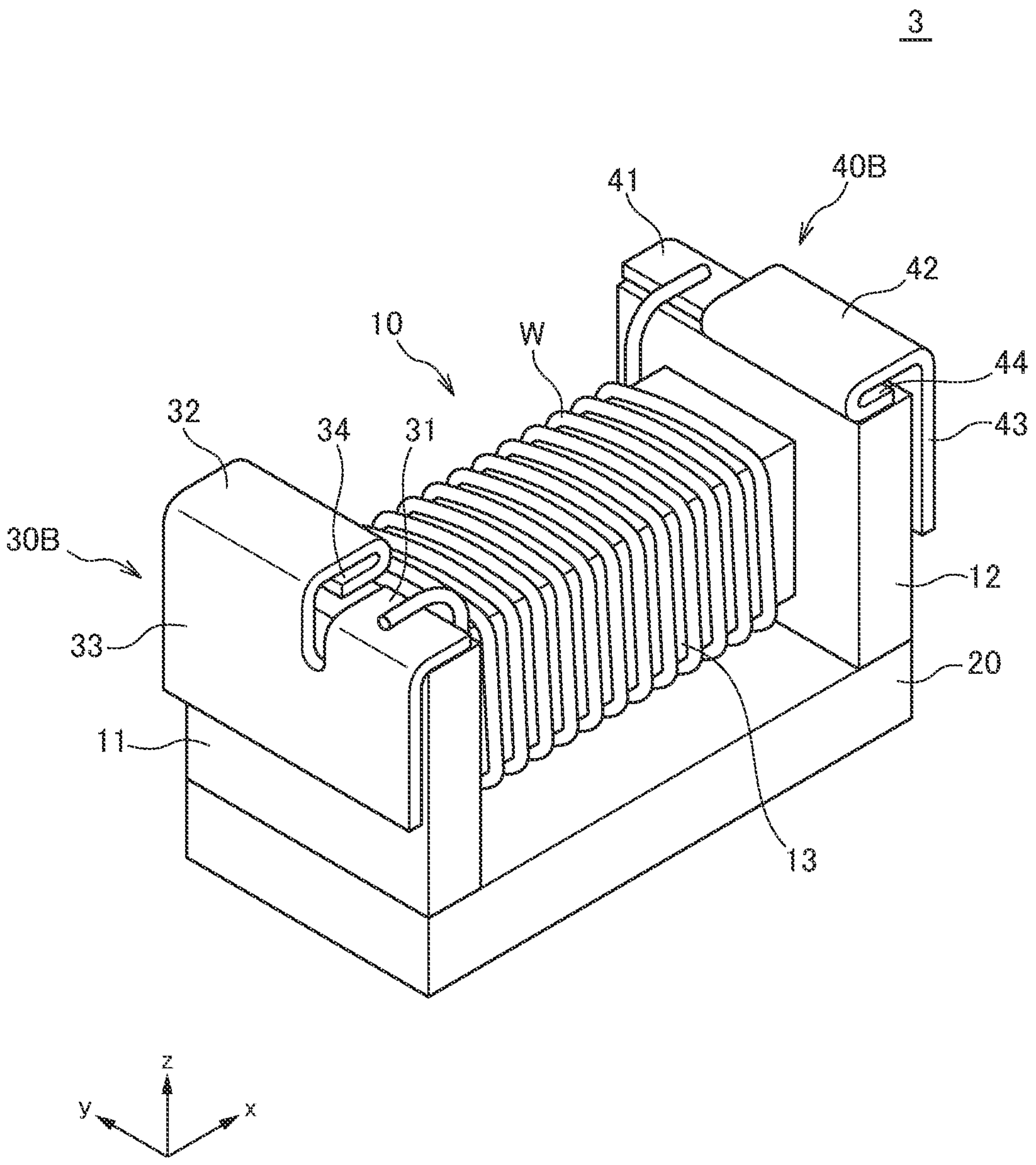
FIG. 8 is a schematic perspective view illustrating the outer appearance of a coil component 3 according to a third embodiment of the present invention.

FIG. 8 is a schematic perspective view illustrating the outer appearance of a coil component 3 according to a third embodiment of the present invention.

As illustrated in FIG. 8, the coil component 3 according to the third embodiment differs from the coil component 1 according to the first embodiment in that terminal fittings 30B and 40B are used in place of the terminal fittings 30A and 40A. Other basic configurations are the same as those of the coil component 1 according to the first embodiment, so the same reference numerals are given to the same elements, and overlapping description will be omitted.

Figure 9:
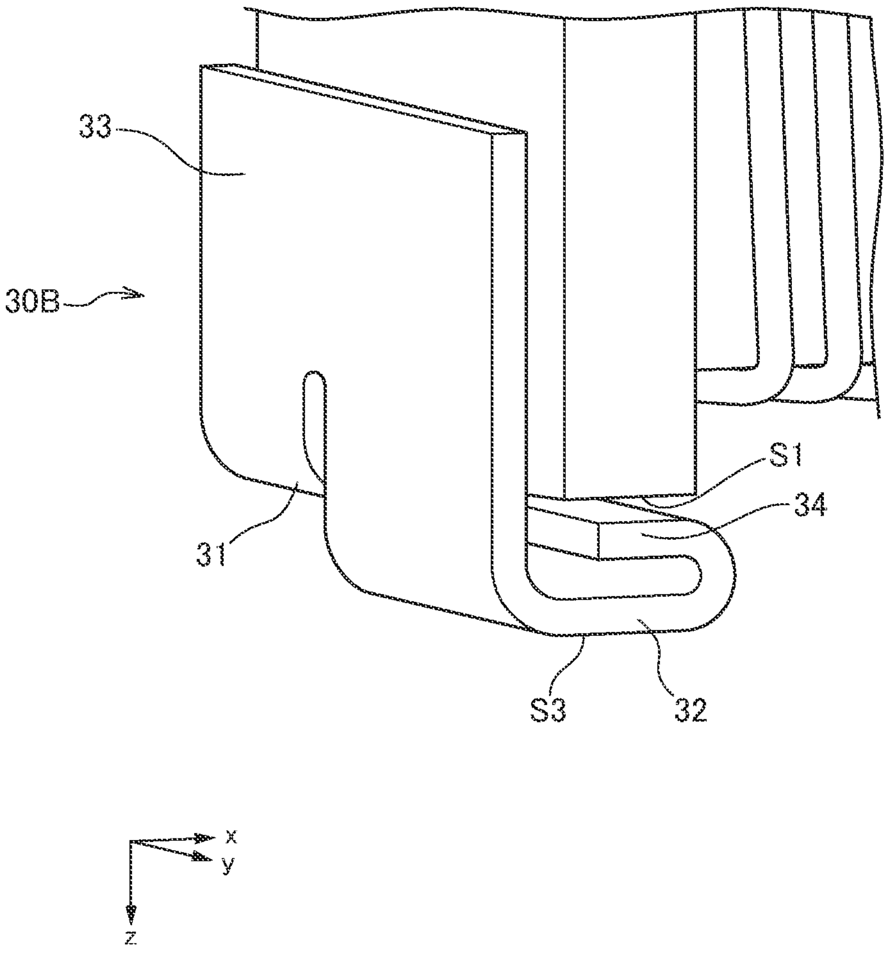
FIG. 9 is a schematic partial perspective view for explaining the shape of the terminal fitting 30B.

FIG. 9 is a schematic partial perspective view for explaining the shape of the terminal fitting 30B.

As illustrated in FIG. 9, the terminal fitting 30B differs from the above terminal fitting 30A in that the mounting part 32 has a folded part 34 positioned between the surfaces S1 and S3. The folded part 34 is a part formed by folding inward the leading end of the mounting part 32 by 180° and does not contact the surface S1 of the flange part 11 in the present embodiment. The terminal fitting 40B has the same folded part (folded part 44).

As described above, in the coil component 3 according to the present embodiment, the terminal fittings 30B and 40B have the folded parts 34 and 44, respectively, so that when an external force is applied to the coil component 3 in the z-direction in a state where the coil component 3 is mounted on the substrate 6, the folded parts 34 and 44 contact the surfaces S1 of the flange parts 11 and 12, respectively, to suppress displacement of the drum core 10 in the z-direction, which makes it less likely to cause breakage due to large displacement, by external force, of the drum core 10 in the z-direction.

Although the folded parts 34 and 44 of the respective terminal fittings 30B and 40B do not contact the surfaces S1 of the flange parts 11 and 12, respectively, in the present embodiment, they may contact each other since the mounting parts 32 and 42 having the folded parts 34 and 44 have springiness themselves.

Fourth Embodiment

Figure 10:
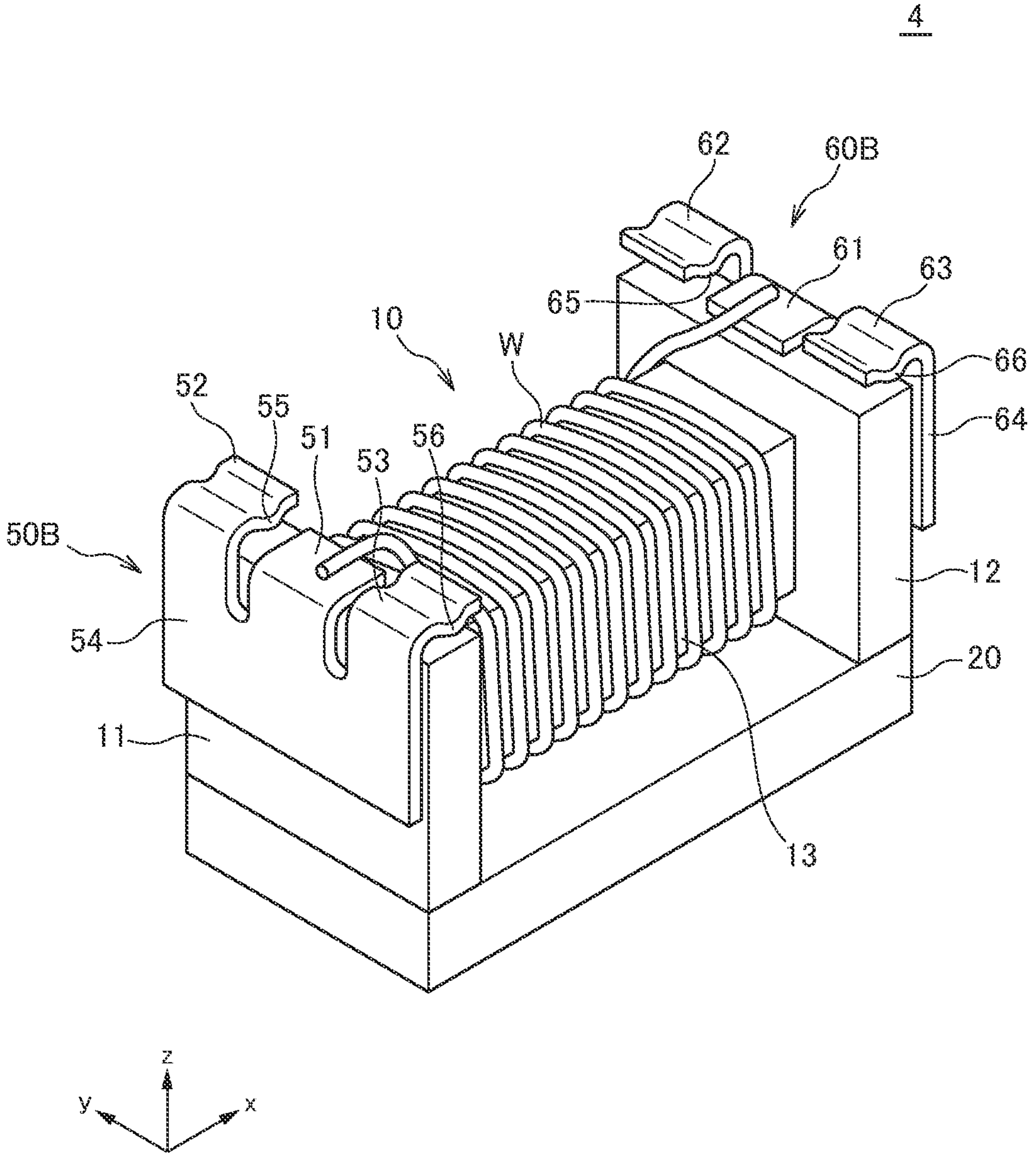
FIG. 10 is a schematic perspective view illustrating the outer appearance of a coil component 4 according to a fourth embodiment of the present invention.

FIG. 10 is a schematic perspective view illustrating the outer appearance of a coil component 4 according to a fourth embodiment of the present invention.

As illustrated in FIG. 10, the coil component 4 according to the fourth embodiment differs from the coil component 2 according to the second embodiment in that terminal fittings 50B and 60B are used in place of the terminal fittings 50A and 60A. Other basic configurations are the same as those of the coil component 2 according to the second embodiment, so the same reference numerals are given to the same elements, and overlapping description will be omitted.

Figure 11:
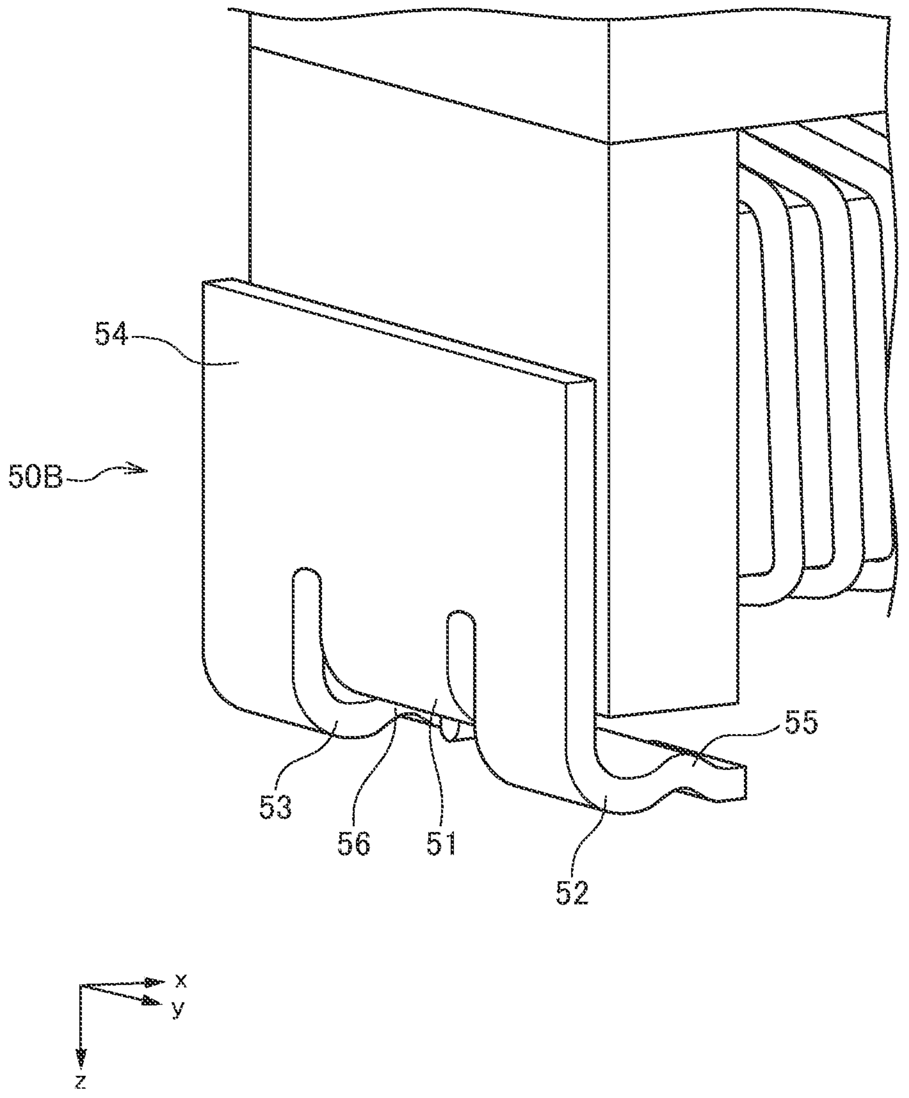
FIG. 11 is a schematic partial perspective view for explaining the shape of the terminal fitting 50B.

FIG. 11 is a schematic partial perspective view for explaining the shape of the terminal fitting 50B.

As illustrated in FIG. 11, the terminal fitting 50B differs from the above terminal fitting 50A in that the mounting parts 52 and 53 have bent parts 55 and 56, respectively, formed by bending partly the mounting parts and 53. Thus, the mounting parts 52 and 53 become locally close to the surface S1 of the flange part 11 at their respective bent parts 55 and 56. In the present embodiment, the bent parts 55 and 56 do not contact the surface S1 of the flange part 11. The terminal fitting 60B has the same bent parts (bent parts 65 and 66).

As described above, in the coil component 4 according to the present embodiment, the terminal fittings 50B and 60B have the bent parts 55, 56 and 65, 66, respectively, so that when an external force is applied to the coil component 4 in the z-direction in a state where the coil component 4 is mounted on the substrate 6, the bent parts 55, 56 and 65, 66 contact the surfaces S1 of the flange parts 11 and 12, respectively, to suppress displacement of the drum core 10 in the z-direction, which makes it less likely to cause breakage due to large displacement, by external force, of the drum core 10 in the z-direction.

Although the bent parts 55, 56 and 65, 66 of the respective terminal fittings 50B and 60B do not contact the surfaces S1 of the flange parts 11 and 12, respectively, in the present embodiment, they may contact each other since the mounting parts 52, 53 and 62, 63 having the bent parts 55, 56 and 65, 66 have springiness themselves.

Fifth Embodiment

Figure 12:
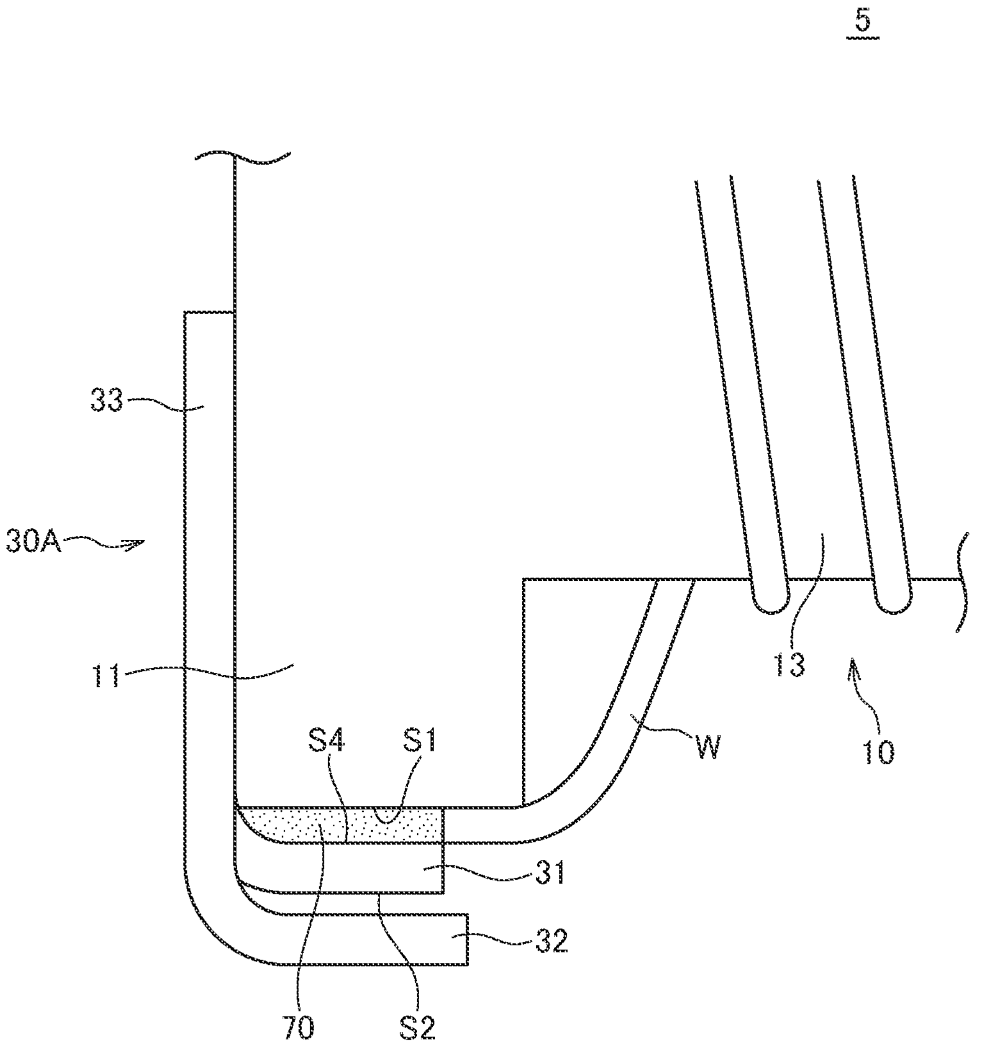
FIG. 12 is a partial side view illustrating the configuration of a main part of a coil component 5 according to a fifth embodiment of the present invention.

FIG. 12 is a partial side view illustrating the configuration of a main part of a coil component 5 according to a fifth embodiment of the present invention.

As illustrated in FIG. 12, in the coil component 5 according to the fifth embodiment, one end portion of the wire W is not connected to the surface S2 of the wire connecting part 31 but is connected to a surface S4 of the wire connecting part 31 through a conductive member 70 such as a solder. Although not illustrated, the same applies to the other end portion of the wire W. Other basic configurations are the same as those of the coil component 1 according to the first embodiment, so the same reference numerals are given to the same elements, and overlapping description will be omitted. The surface S4 of the wire connecting part 31 is the xy plane facing the surface S1 of the flange part 11, and the conductive member 70 is provided between the surfaces S1 and S4. The end portion of the wire W is connected to the conductive member 70. Thus, in a state where the coil component 5 is mounted on the substrate 6, interference between the wire W and the substrate 6 is much less likely to occur.

While the preferred embodiment of the present invention has been described, the present invention is not limited to the above embodiment, and various modifications may be made within the scope of the present invention, and all such modifications are included in the present invention.

What is claimed is:

1. A coil component comprising:

a core having a winding core part and a flange part;

a terminal fitting fixed to the flange part; and a wire wound around the winding core part, wherein the flange part has a first surface including first, second, and third regions, wherein the winding core part extends in a first direction, wherein the first, second, and third regions are arranged in a second direction perpendicular to the first direction such that the third region is arranged between the first and second regions in the second direction, wherein the terminal fitting has a wire connecting part to which the wire is connected and a mounting part, wherein the wire connecting part contacts the first region of the first surface without contacting the second and third regions, wherein the mounting part covers the second region of the first surface without covering the first and third regions so as not to contact the second region of the first surface, wherein the third region does not contact the wire connecting part and is not covered with the mounting part, and wherein the second region is greater in width in the second direction than each of the first and third regions.

2. The coil component as claimed in claim 1, wherein the first surface is substantially flat over the first, second, and third regions.

3. The coil component as claimed in claim 1, wherein the terminal fitting has a slit positioned between the wire connecting part and the mounting part in the second direction, and wherein the slit overlaps the third region of the first surface so as not to overlap the first and second regions.

4. The coil component as claimed in claim 1, wherein the wire is an only wire wound around the winding core part of the core.

5. The coil component as claimed in claim 4, wherein the terminal fitting is an only terminal fitting fixed to the flange part of the core.

6. The coil component as claimed in claim 1, wherein an end of the wire connected to the wire connecting part is located over the second region of the first surface.

7. The coil component as claimed in claim 6, wherein a part of the wire connecting part is sandwiched between the end of the wire and the first surface of the flange part.

* * * * *